(12) United States Patent
Young et al.

(10) Patent No.: US 8,514,129 B1
(45) Date of Patent: Aug. 20, 2013

(54) BUFFERING TECHNIQUES FOR RAPID PROCESSING OF SAMPLES OF SIGNALS MODULATED WITH PERIODIC WAVEFORMS

(75) Inventors: Chi-Yuen Young, Hong Kong (HK); Mao Yu, San Jose, CA (US); Xiangdong Jin, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 209 days.

(21) Appl. No.: 13/051,114

(22) Filed: Mar. 18, 2011

Related U.S. Application Data

(60) Provisional application No. 61/323,271, filed on Apr. 12, 2010.

(51) Int. Cl.
*G01S 19/35* (2010.01)
(52) U.S. Cl.
USPC .................................................. 342/357.75
(58) Field of Classification Search
USPC .................................................. 342/357.75
See application file for complete search history.

(56) References Cited

U.S. PATENT DOCUMENTS

| | | | |
|---|---|---|---|
| 5,633,829 A * | 5/1997 | Matsumura et al. | 365/221 |
| 5,850,393 A * | 12/1998 | Adachi | 370/335 |
| 2005/0094677 A1* | 5/2005 | Lu et al. | 370/535 |
| 2006/0218341 A1* | 9/2006 | Nolte et al. | 711/109 |
| 2007/0080856 A1* | 4/2007 | Camp, Jr. | 342/357.12 |
| 2011/0007783 A1* | 1/2011 | Weill | 375/150 |
| 2011/0216857 A1* | 9/2011 | Gotman et al. | 375/341 |

* cited by examiner

*Primary Examiner* — Harry Liu

(57) ABSTRACT

Apparatus having corresponding methods and non-transitory computer-readable media comprise: a sampler configured to sample a signal, wherein the signal is modulated with a waveform having a known period, wherein the sampler obtains K samples in each period, and wherein each of the samples is N bits long, wherein K is an integer greater than 0, and N is an integer greater than 1; a memory bank, wherein the memory bank has M columns and K rows, wherein each column is N bits wide, and wherein M is an integer greater than 0; a write controller configured to write the samples to the memory bank in column order; a read controller configured to read the samples from the memory bank in row order; and an integrator configured to integrate the samples read from the memory bank, wherein the integrator provides a respective integration result for each row.

21 Claims, 10 Drawing Sheets

BUFFERING TECHNIQUES FOR RAPID PROCESSING OF SAMPLES OF SIGNALS MODULATED WITH PERIODIC WAVEFORMS

CROSS-REFERENCE TO RELATED APPLICATIONS

This disclosure claims the benefit of U.S. Provisional Patent Application Ser. No. 61/323,271, filed on Apr. 12, 2010, entitled "INNOVATIVE GPS DINBUF STORAGE METHOD," the disclosure thereof incorporated by reference herein in its entirety.

FIELD

The present disclosure relates generally to the field of signal processing. More particularly, the present disclosure relates to buffering techniques for samples of signals modulated with periodic waveforms.

BACKGROUND

Digital signal processing refers to the use of digital techniques to process signals. Before signals can be processed using digital signal processing techniques, the signals must first be converted to digital samples. The digital samples are generally stored in a buffer before processing, for example to account for differences between the rate of receiving the signals and the rate of processing the signals. A digital signal processor retrieves the digital samples from the buffer, and then processes the retrieved digital samples. FIG. 1 shows a conventional digital signal processing system 100. Referring to FIG. 1, a signal 102 is converted to digital samples 104 by a sampler 106. Digital samples 104 are stored in a buffer 108. A digital signal processor (DSP) 110 retrieves digital samples 104, and then processes retrieved digital samples 104.

According to conventional buffering techniques, digital samples 104 are generally stored in buffer 108 in row order. That is, a contiguous group of sequential samples 104 is stored at a single address in buffer 108, where each address uniquely identifies a row in buffer 108. When processing signals modulated with a periodic waveform, it is often desirable to integrate the signal by combining samples separated by one or more periods. In such applications, sampling rates and memory width are generally chosen so that one row of samples corresponds to one period of the periodic waveform. FIG. 2 illustrates this technique for a buffer 200 and a waveform period of 1 ms.

Referring to FIG. 2, a respective 1 ms group of samples is stored at each address of buffer 200, and successive groups are stored at respective successive addresses. Therefore each row of buffer 200 stores exactly one period of samples of the periodic waveform. A digital signal processor retrieves the samples from buffer 200 in row order for processing. Because each row corresponds to one period, the samples are integrated by operating upon multiple rows. For example, the digital signal processor integrates corresponding samples in multiple rows to obtain an integration result. For many applications this buffering technique is adequate. However, at high frequencies and/or sampling rates, this integration process is too slow to keep up with the incoming signal.

SUMMARY

In general, in one aspect, an embodiment features an apparatus comprising: a sampler configured to sample a signal, wherein the signal is modulated with a waveform having a known period, wherein the sampler obtains K samples in each period, and wherein each of the samples is N bits long, wherein K is an integer greater than 0, and N is an integer greater than 1; a memory bank, wherein the memory bank has M columns and K rows, wherein each column is N bits wide, and wherein M is an integer greater than 0; a write controller configured to write the samples to the memory bank in column order; a read controller configured to read the samples from the memory bank in row order; and an integrator configured to integrate the samples read from the memory bank, wherein the integrator provides a respective integration result for each row.

Embodiments of the apparatus can include one or more of the following features. In some embodiments, the memory bank is a first memory bank, and the apparatus further comprises: a first buffer comprising the first memory bank; and a second buffer comprising a second memory bank, wherein the second memory bank has M columns and K rows, and wherein each column of the second memory bank is N bits wide; wherein the first memory controller writes K×M consecutive samples to the first memory bank in column order, and writes the following K×M consecutive samples to the second memory bank in column order; and wherein the second memory controller reads the samples from the first and second memory banks in row order. In some embodiments, the waveform is a first waveform, the apparatus further comprises: a correlator configured to correlate the integration results with a second waveform, wherein the second waveform represents a pseudorandom number. Some embodiments comprise a transmitter identification module configured to determine an identity of a transmitter of the signal based on an output of the correlator. Some embodiments comprise a location module configured to determine a location of the apparatus based on the identity of the transmitter. Some embodiments comprise a receiver configured to receive the signal. Some embodiments comprise a device comprising the apparatus. In some embodiments, the signal is a global positioning system (GPS) signal.

In general, in one aspect, an embodiment features a method comprising: sampling a signal, wherein the signal is modulated with a waveform having a known period, wherein K samples are obtained in each period, wherein each of the samples is N bits long, and wherein K is an integer greater than 0, and N is an integer greater than 1; writing the samples to a memory bank in column order, wherein the memory bank has M columns and K rows, wherein each column is N bits wide, and wherein M is an integer greater than 0; reading the samples from the memory bank in row order; and integrating the samples read from the memory bank, wherein the integrating provides a respective integration result for each row.

Embodiments of the method can include one or more of the following features. In some embodiments, the memory bank is a first memory bank in a first buffer, and the method further comprises: writing K×M consecutive samples to the first memory bank in column order; writing the following K×M consecutive samples in column order to a second memory bank in a second buffer, wherein the second memory bank has M columns and K rows, and wherein each column of the second memory bank is N bits wide; and reading the samples from the first and second memory banks in row order. In some embodiments, the waveform is a first waveform, and the method further comprises: correlating the integration results with a second waveform, wherein the second waveform represents a pseudorandom number. Some embodiments comprise determining an identity of a transmitter of the signal based on an output of the correlator. Some embodiments comprise determining a location of a device based on the identity of the transmitter. In some embodiments, the signal is a global positioning system (GPS) signal.

In general, in one aspect, an embodiment features non-transitory computer-readable media embodying instructions executable by a computer to perform functions comprising: writing samples of a signal to a memory bank in column order, wherein the signal is modulated with a waveform having a known period, wherein K samples exist for each period, wherein each of the samples is N bits long, wherein the memory bank has M columns and K rows, wherein each column is N bits wide, and wherein K is an integer greater than 0, N is an integer greater than 1, and M is an integer greater than 0; reading the samples from the memory bank in row order; and integrating the samples read from the memory bank, wherein the integrating provides a respective integration result for each row.

Embodiments of the non-transitory computer-readable media can include one or more of the following features. In some embodiments, the memory bank is a first memory bank in a first buffer, and the functions further comprise: writing K×M consecutive samples to the first memory bank in column order; writing the following K×M consecutive samples in column order to a second memory bank in a second buffer, wherein the second memory bank has M columns and K rows, and wherein each column of the second memory bank is N bits wide; and reading the samples from the first and second memory banks in row order. In some embodiments, the waveform is a first waveform, and the functions further comprise: correlating the integration results with a second waveform, wherein the second waveform represents a pseudorandom number. In some embodiments, the functions further comprise: determining an identity of a transmitter of the signal based on an output of the correlator. In some embodiments, the functions further comprise: determining a location of a device based on the identity of the transmitter. In some embodiments, the signal is a global positioning system (GPS) signal.

The details of one or more implementations are set forth in the accompanying drawings and the description below. Other features will be apparent from the description and drawings, and from the claims.

Figure 1:
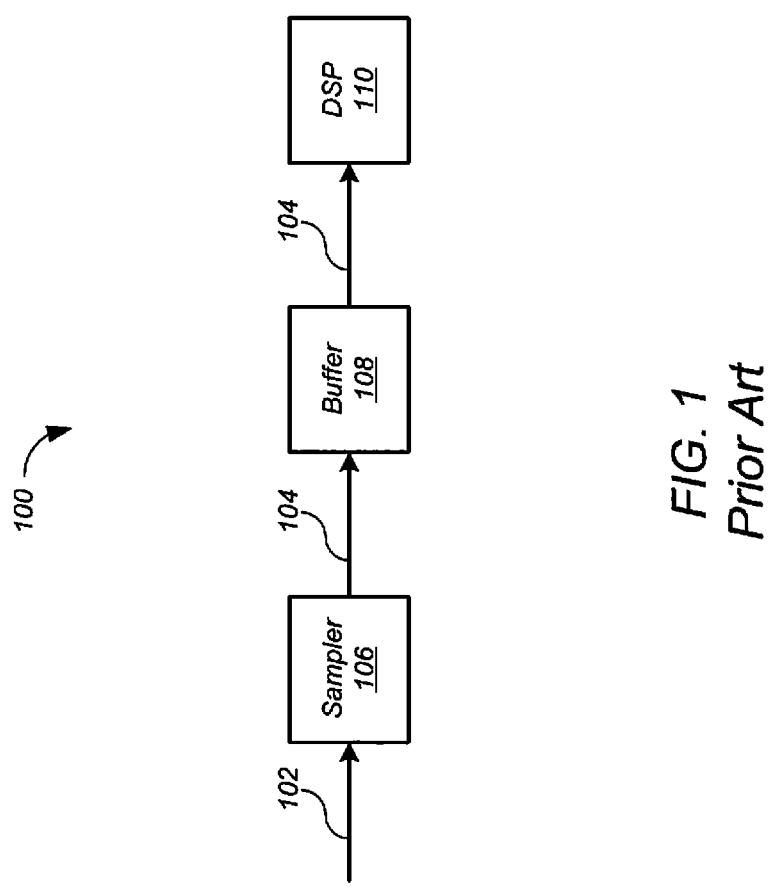
FIG. 1 shows a conventional digital signal processing system.
Figure 2:
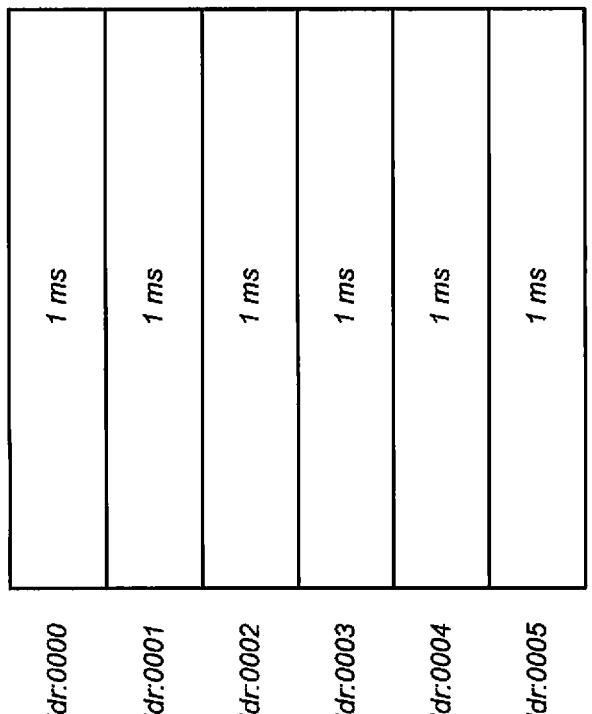
FIG. 2 illustrates a conventional buffering technique for the digital signal processing system of FIG. 1.

The leading digit(s) of each reference numeral used in this specification indicates the number of the drawing in which the reference numeral first appears.

DETAILED DESCRIPTION

Figure 3:
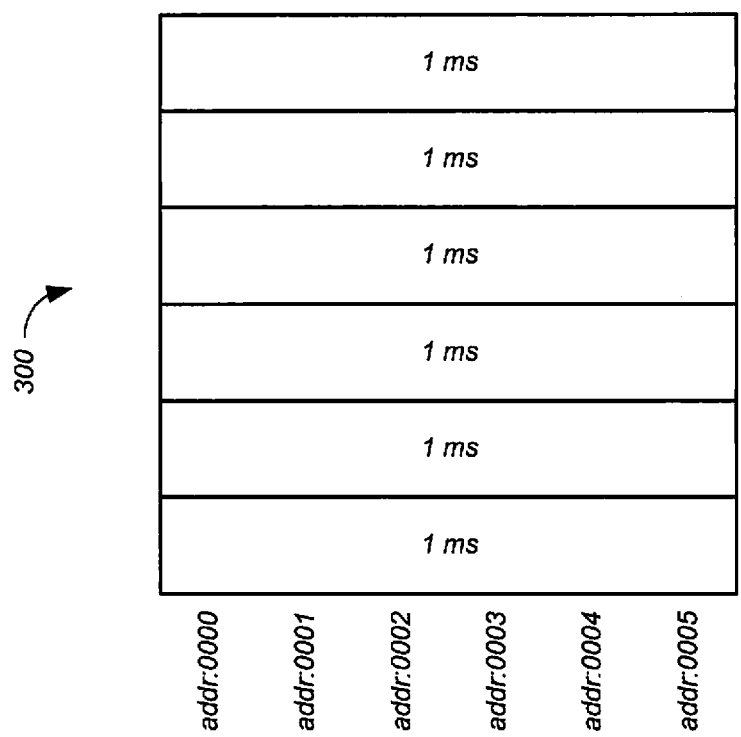
FIG. 3 illustrates a buffering technique according to one embodiment.

Embodiments of the present disclosure provide elements of buffering techniques for samples of signals modulated with periodic waveforms. According to these techniques, digital samples of a signal modulated with a periodic waveform are stored in a buffer in column order and retrieved from the buffer in row order, where each column of the buffer stores one period of the samples and each address uniquely identifies a row in the buffer. FIG. 3 illustrates this buffering technique according to one embodiment.

Referring to FIG. 3, a respective 1 ms group of samples is stored in each column of buffer 300, and successive groups are stored at respective successive columns. Therefore each column of buffer 300 stores exactly one period of samples of the periodic waveform. This technique places corresponding samples (that is, samples having the same phase with respect to the periodic waveform) from different periods within a single row in buffer 300. Therefore, a digital signal processor can perform integration upon data retrieved from a single address of buffer 300. In contrast, conventional techniques must retrieve, and operate upon, data from multiple addresses to perform an integration operation because corresponding samples from different periods are stored in different rows.

The described buffering techniques are suitable for applications featuring high frequencies and/or sampling rates, for example such as global positioning system (GPS) signals and the like. However, while the disclosed embodiments are described in terms of GPS signals, the disclosed techniques are not limited to GPS signals, and can be used with other sorts of signals that are modulated with waveforms having known periods.

Figure 4:
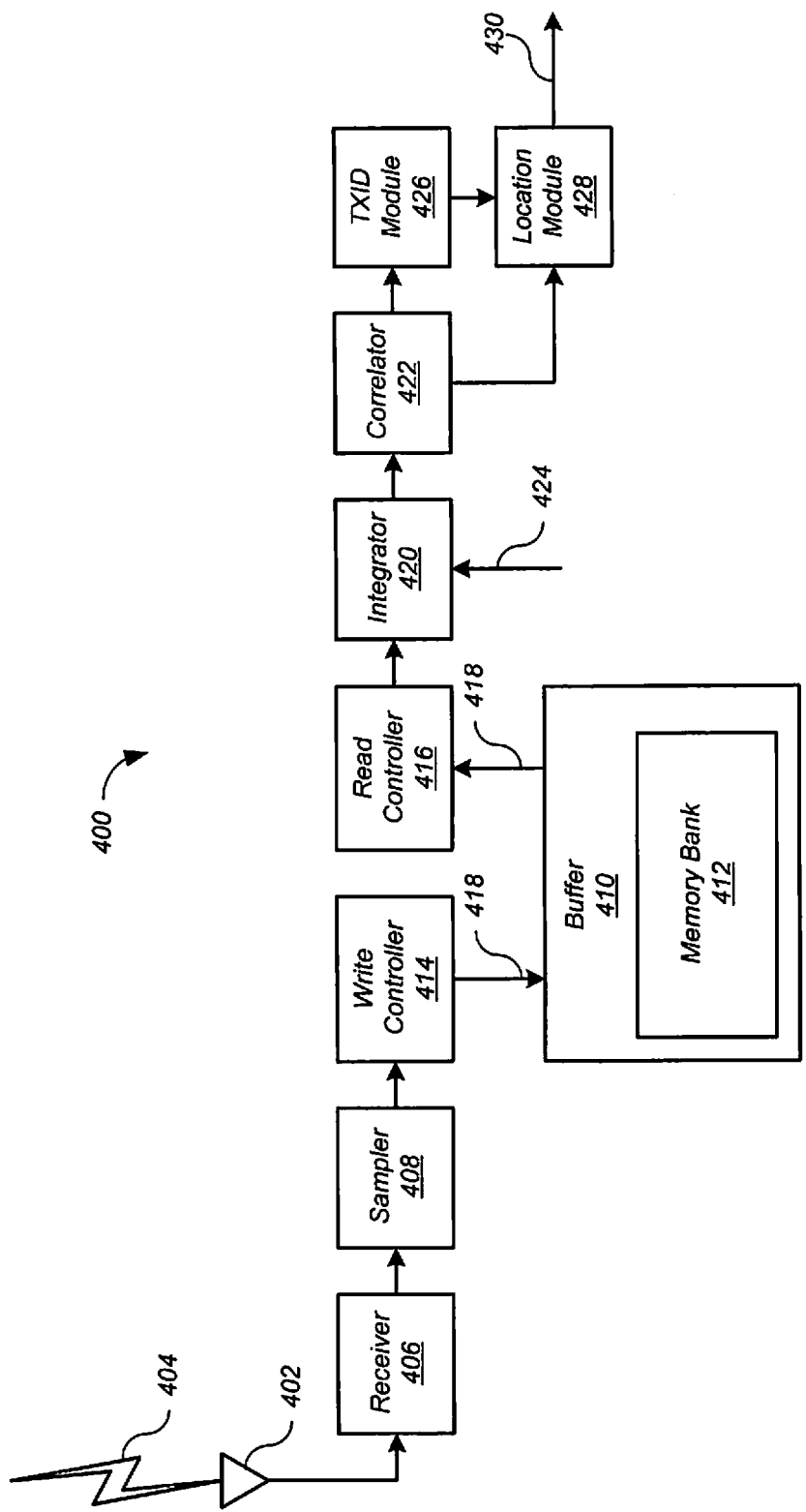
FIG. 4 shows elements of a digital signal processing system according to an online embodiment.

FIG. 4 shows elements of a digital signal processing system 400 according to an online embodiment. The embodiment of FIG. 4 is referred to as "online" because it is suitable for processing GPS signals as they are received. However, this online embodiment can also be used in an "offline" mode to process a set of GPS signals after the entire set has been received and stored. Although in the described embodiments the elements of digital signal processing system 400 are presented in one arrangement, other embodiments may feature other arrangements. For example, elements of digital signal processing system 400 can be implemented in hardware, software, or combinations thereof.

Referring to FIG. 4, digital signal processing system 400 includes an antenna 402 configured to obtain a GPS signal 404, a receiver 406 configured to receive GPS signal 404, a sampler 408 configured to sample signal 404, and a buffer 410 that includes one or more memory banks 412. Digital signal processing system 400 also includes a write controller 414 configured to write samples 418 to memory bank 412 in column order, and a read controller 416 configured to read samples 418 from memory bank 412 in row order. Digital signal processing system 400 also includes an integrator 420 configured to integrate samples 418 read from memory bank 412, a correlator 422 configured to correlate the results of the integration with a reference waveform 424, a transmitter identification (TXID) module 426 configured to determine an identity of a transmitter of GPS signal 404 based on an output of correlator 422, and a location module 428 configured to determine a location 430 of digital signal processing system 400 based on the identity of the transmitter. Some or all of integrator 420, correlator 422, transmitter identification module 426, and location module 428 can be implemented as a digital signal processor. Some or all of the elements of digital signal processing system 400 can be implemented within a device such as a GPS receiver, smart phone, or the like.

Figure 5:
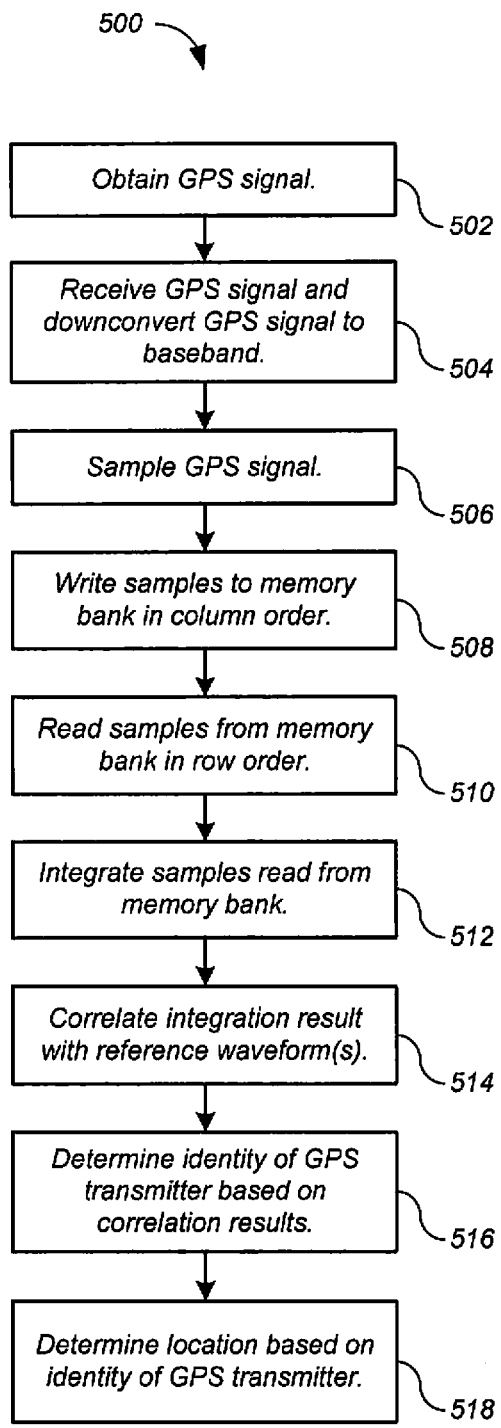
FIG. 5 shows a process for the digital signal processing system of FIG. 4 according to one embodiment.

FIG. 5 shows a process 500 for digital signal processing system 400 of FIG. 4 according to one embodiment. Although in the described embodiments the elements of process 500 are presented in one arrangement, other embodiments may feature other arrangements. For example, in various embodiments, some or all of the elements of process 500 can be executed in a different order, concurrently, and the like.

Referring to FIGS. 4 and 5, at 502 antenna 402 obtains GPS signal 404. At 504 receiver 406 receives GPS signal 404, and downconverts GPS signal 404 to baseband. At 506 sampler 408 samples GPS signal 404. GPS signal 404 is modulated with a pseudonoise code, which is a waveform having a known period. Sampler 408 obtains K digital samples in each period of GPS signal 404, where K is an integer greater than 0. In one embodiment, the period is 1 ms and the sampling frequency is 2.048 MHz, yielding K=2048. Each of the samples is N bits long, where N is an integer greater than 1. In one embodiment, each sample includes 2 in-phase bits and 2 quadrature-phase bits, yielding N=4. In another embodiment, each sample includes 3 in-phase bits and 3 quadrature-phase bits, yielding N=6. Of course, other values for N and K can be used instead.

Figure 6:
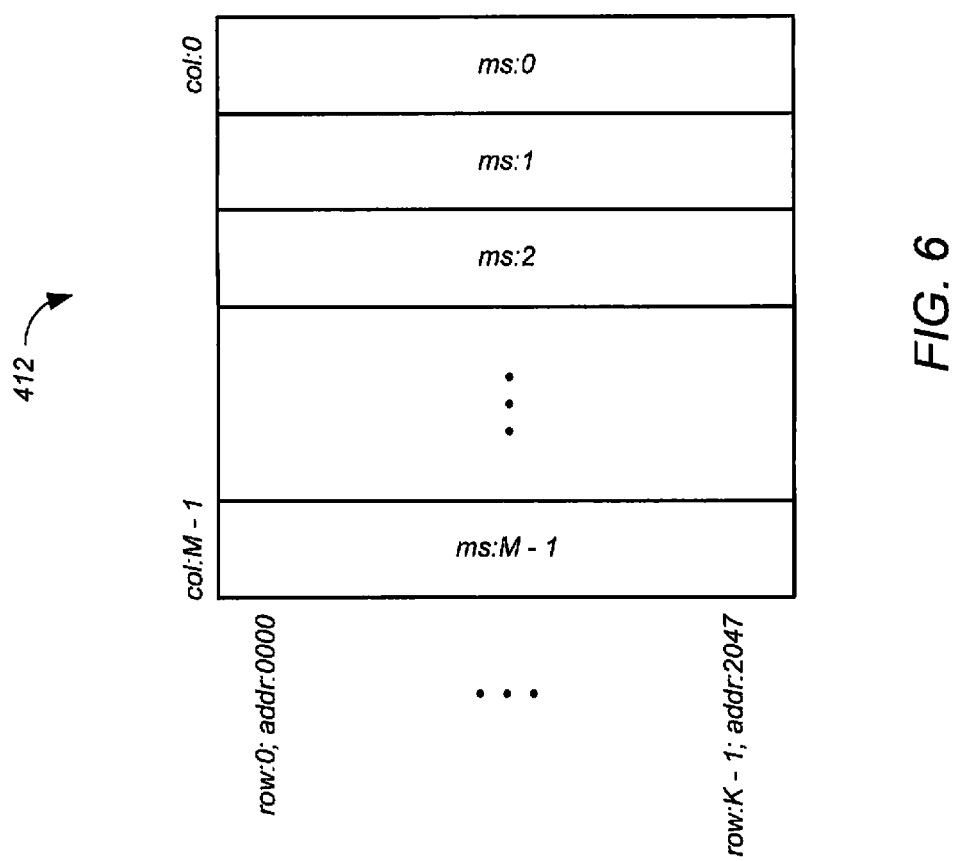
FIG. 6 illustrates a write operation for the digital signal processing system of FIG. 4.

At 508 write controller 414 writes samples 418 to memory bank 412 in column order. FIG. 6 illustrates the operation for a memory bank 412 having M columns and K rows, where each column is N bits wide. Referring to FIG. 6, memory bank 412 has K=2048 addresses. Each address identifies one row. Each row is capable of storing M samples, where M is an integer greater than 0. Write controller 414 writes a respective group of samples to each column, where the group represents one period of the pseudonoise code. In the example of FIG. 6, the period is 1 ms. For example, write controller 414 writes the first 1 ms of samples (ms:0) to column 0, the next ms of samples (ms:1) to column 1, and so on. Buffer 410 is implemented as a circular buffer, so that after writing the last column (column M−1), write controller 414 writes column 0 again. To write samples to a single column of a memory bank 412, write controller 414 employs a data mask or the like, thereby leaving data in the other columns unchanged.

Referring again to FIGS. 4 and 5, at 510 read controller 416 reads samples 418 from memory bank 412 in row order. In the example of FIG. 6, read controller 416 reads M samples from one address of memory bank 412. Each sample is N bits long.

At 512, integrator 420 integrates the M samples read from memory bank 412, and provides a respective integration result. At 514, correlator 422 correlates the integration result with one or more reference waveforms 424. Each reference waveform 424 represents a pseudorandom number. Correlator 422 provides a correlation result for each reference waveform 424. At 516 transmitter identification module 426 determines an identity of a transmitter of GPS signal 404 based on the correlation results. For example, transmitter identification module 426 identifies the pseudorandom number used to modulate GPS signal 404 based on correlation peaks in the correlation result, and identifies the GPS transmitter using the pseudorandom number. The GPS transmitter can be a GPS satellite, a GPS pseudolite, or the like. At 518, location module 428 determines a location of digital signal processing system 400 based on the identity of the GPS transmitter. For example, location module 428 employs a pseudorange and location for the GPS transmitter to determine the location.

Figure 7:
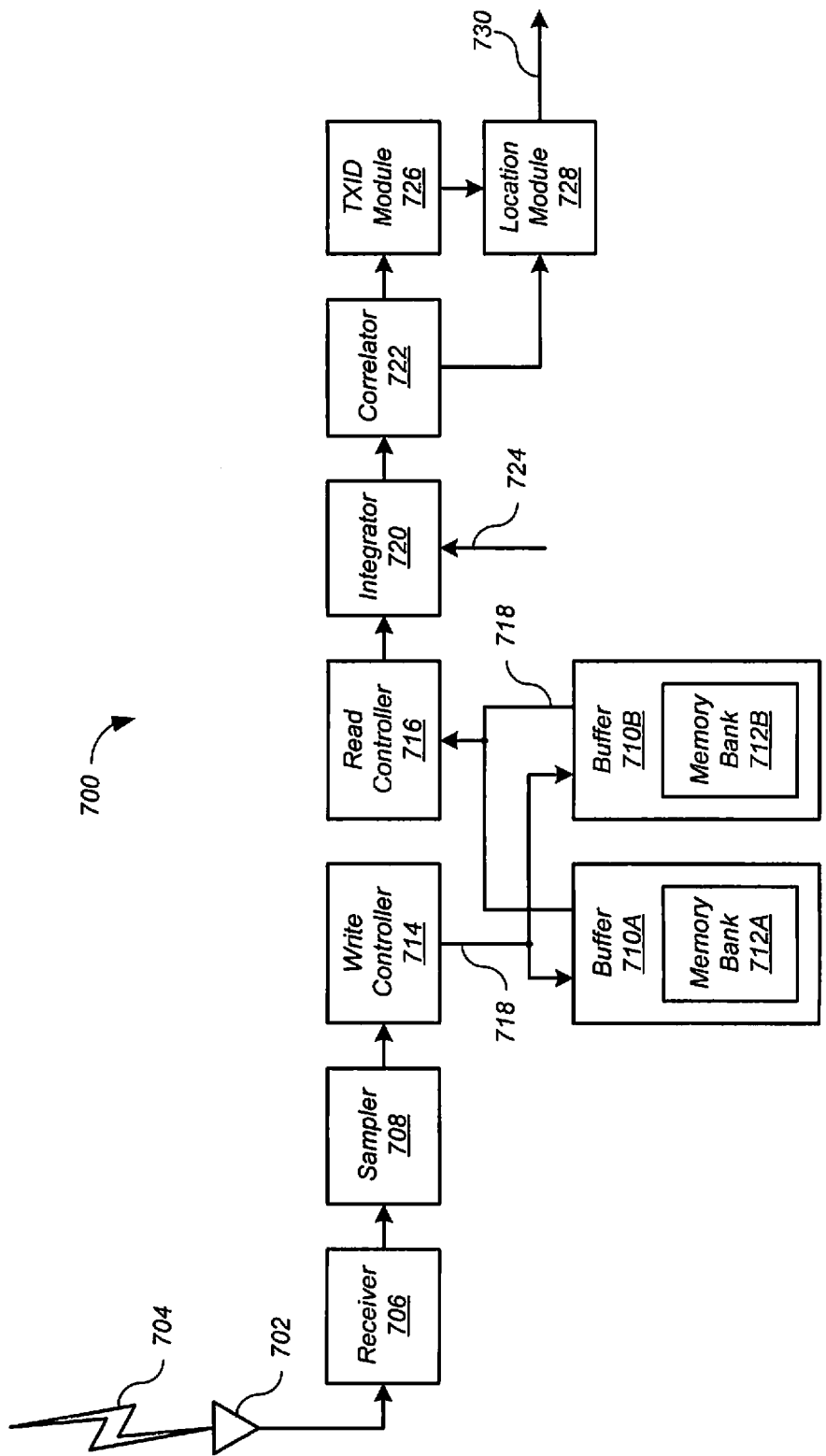
FIG. 7 shows elements of a digital signal processing system according to an online embodiment.

FIG. 7 shows elements of a digital signal processing system 700 according to an online embodiment. Although in the described embodiments the elements of digital signal processing system 700 are presented in one arrangement, other embodiments may feature other arrangements. For example, elements of digital signal processing system 700 can be implemented in hardware, software, or combinations thereof.

The embodiment of FIG. 7 is referred to as "offline" because it is suitable for processing a set of GPS signals after the entire set has been received and stored. Offline embodiments are particularly useful when a large number of samples are to be processed. For example, while an online embodiment could be used for up to 30 ms of samples, an offline embodiment is required for 120 ms of samples, assuming a sampling rate of 2.048 MHz. In such embodiments, the amount of data to be stored is too large for one memory bank. According to the offline embodiments disclosed herein, multiple buffers are employed, where each buffer includes one or more memory banks. The samples are written to the buffers in ping-pong fashion. That is, after filling one memory bank in a first buffer, the write controller writes the following samples to a memory bank in a second buffer. After filling that buffer, the write controller writes the following samples to a memory bank in the first buffer, and so on. Using buffers that are M samples wide, where M is not less than the number of samples in a single period of the periodic waveform, ensures that the read controller can read all of the samples in any single period in a single memory cycle.

Referring to FIG. 7, digital signal processing system 700 includes an antenna 702 configured to obtain a GPS signal 704, a receiver 706 configured to receive GPS signal 704, a sampler 708 configured to sample signal 704, and two buffers 710A and 710B. Each buffer 710 includes one or more memory banks 712A and 712B. Digital signal processing system 700 also includes a write controller 714 configured to write samples 718 to memory banks 712 in column order, and a read controller 716 configured to read samples 718 from memory banks 712 in row order. While an embodiment having only two buffers 710 is described, other embodiments can feature greater numbers of buffers 710.

Digital signal processing system 700 also includes an integrator 720 configured to integrate samples 718 read from memory bank 712, a correlator 722 configured to correlate the results of the integration with a reference waveform 724, a transmitter identification module 726 configured to determine an identity of a transmitter of GPS signal 704 based on an output of correlator 722, and a location module 728 configured to determine a location 730 of digital signal processing system 700 based on the identity of the transmitter. Some or all of integrator 720, correlator 722, transmitter identification module 726, and location module 728 can be implemented as a digital signal processor. Some or all of the elements of digital signal processing system 700 can be implemented within a device such as a GPS receiver, smart phone, or the like.

Figure 8:
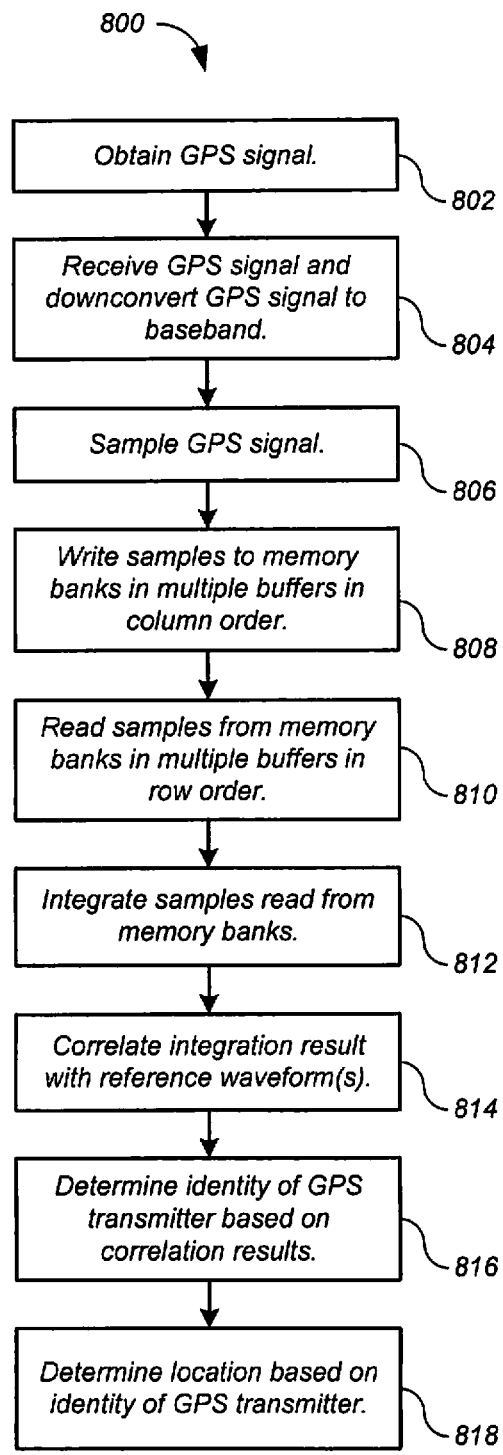
FIG. 8 shows a process for the digital signal processing system of FIG. 7 according to one embodiment.

FIG. 8 shows a process 800 for digital signal processing system 700 of FIG. 7 according to one embodiment. Although in the described embodiments the elements of process 800 are presented in one arrangement, other embodiments may feature other arrangements. For example, in various embodiments, some or all of the elements of process 800 can be executed in a different order, concurrently, and the like.

Referring to FIGS. 7 and 8, at 802 antenna 702 obtains GPS signal 704. At 804 receiver 706 receives GPS signal 704, and downconverts GPS signal 704 to baseband. At 806 sampler 708 samples GPS signal 704. GPS signal 704 is modulated with a pseudonoise code, which is a waveform having a known period. Sampler 708 obtains K digital samples in each period of GPS signal 704. In one embodiment, the period is 1 ms and the sampling frequency is 2.048 MHz, yielding K=2048. Each of the samples is N bits long. In one embodiment, each sample includes 2 in-phase bits and 2 quadrature-phase bits, yielding N=4. In another embodiment, each sample includes 3 in-phase bits and 3 quadrature-phase bits, yielding N=6. Of course, other values for N and K can be used instead.

Figure 9:
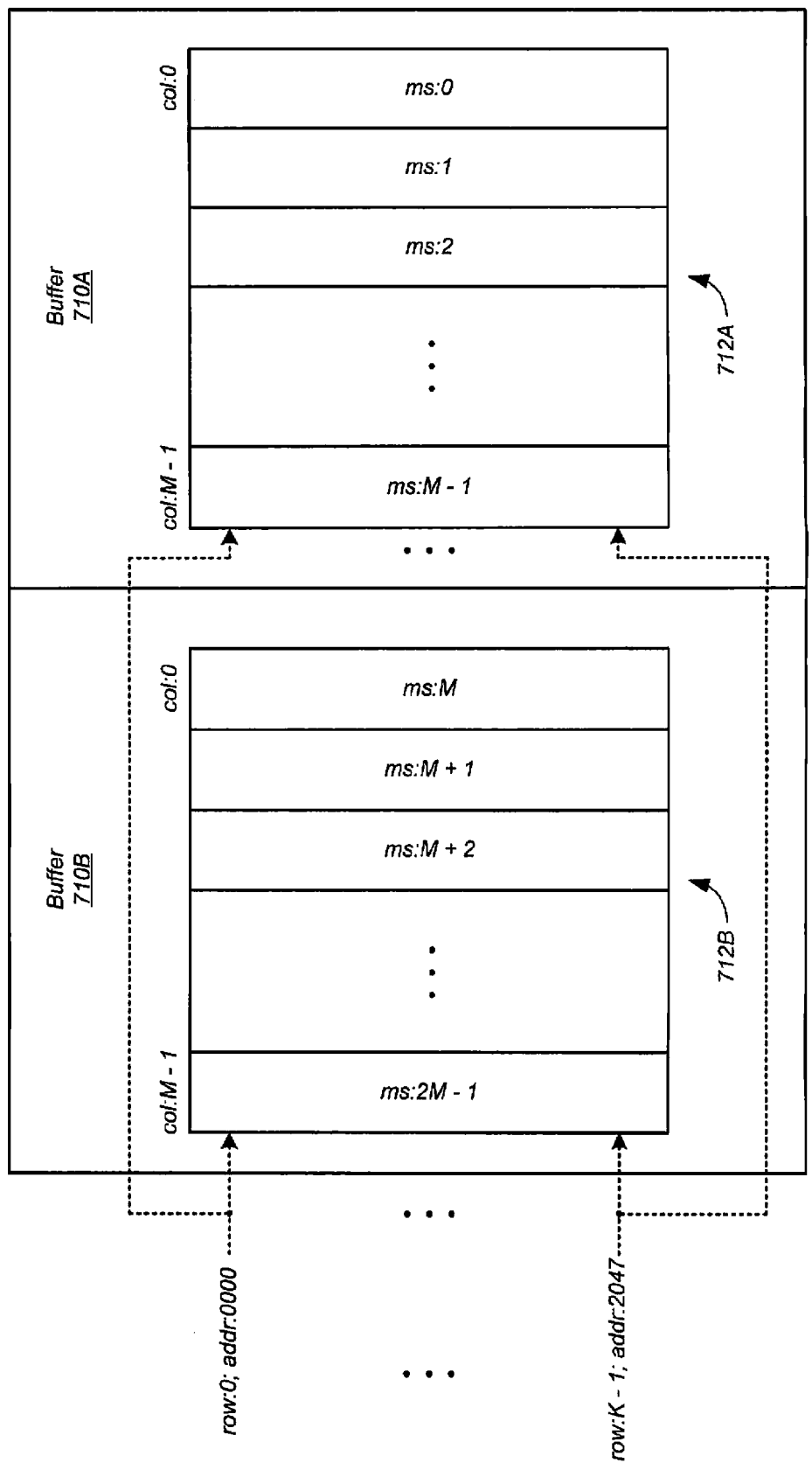
FIG. 9 illustrates a write operation for the digital signal processing system of FIG. 7.

At 808 write controller 714 writes samples 718 to memory banks 712 in multiple buffers 710 in column order. FIG. 9 illustrates the operation for memory banks 712 each having M columns and K rows, where each column is N bits wide. Referring to FIG. 9, each memory bank 712 has K=2048 addresses. Each address identifies one row in each buffer 710. Each row of a memory bank 712 is capable of storing M samples. Write controller 714 writes a respective group of samples to each column, where the group represents one period of the pseudonoise code. In the example of FIG. 9, the period is 1 ms. For example, write controller 714 writes the first 1 ms of samples (ms:0) to column 0, the next ms of samples (ms:1) to column 1, and so on. To write samples to a single column of a memory bank, write controller 714 employs a data mask or the like, thereby leaving data in the other columns unchanged.

Buffers 710 are employed in ping-pong fashion, so that after writing the last column (col:M−1) of a memory bank 712 in one buffer 710, write controller 714 writes to the first column (col:0) of a memory bank 712 in the other buffer 710. Buffers 710 are implemented together in a circular manner, so that after writing the last column in memory bank 712B of buffer 710B, write controller 714 returns to the first column of memory bank 712A.

Figure 10:
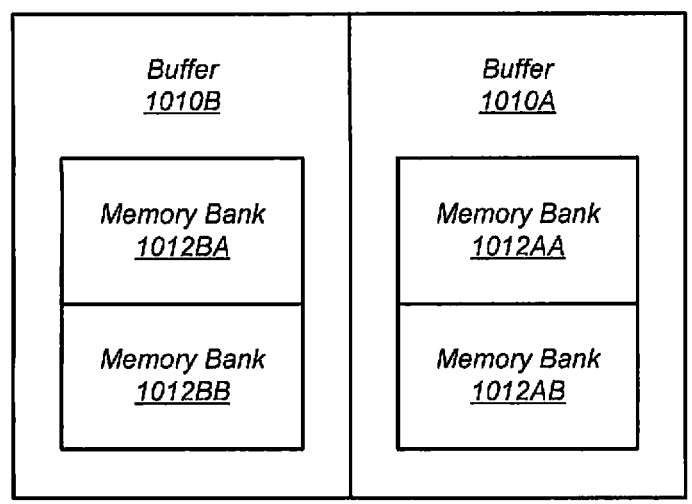
FIG. 10 illustrates a write operation for the digital signal processing system of FIG. 7 where each buffer includes multiple memory banks.

FIG. 10 illustrates this technique for an embodiment where each buffer 710 includes multiple memory banks 712. In such embodiments, the ping-pong approach is used until all of the memory banks 712 are filled before returning to the first memory bank 712. Referring to FIG. 10, two buffers 1010A and 1010B are shown. Buffer 1010A includes two memory banks 1012AA and 1012AB. Buffer 1010B includes two memory banks 1012BA and 1012BB. Write controller 714 writes memory banks 1012 in the following order: 1012AA, 1012BA, 1012AB, 1012BB, 1012AA, and so on.

Referring again to FIGS. 7 and 8, at 810 read controller 716 reads samples 718 from memory banks 712 in multiple buffers 710 in row order. For example, referring to FIG. 8, read controller 716 reads samples 718 from the first row (row:0; addr:0000) of memory banks 712A and 712B before reading samples from the second row.

The samples corresponding to one period of the pseudonoise waveform never span more than two memory banks 712, and are never found in multiple rows of the same memory bank 712. That is, it is never necessary to read multiple addresses in a memory bank 712 to obtain all of the samples corresponding to one period of the pseudonoise waveform. All of the samples corresponding to one period of the pseudonoise waveform can be read either from the same address in both buffers 710 or from one address in one buffer 710 and an adjacent address in the other buffer 710. These reads can always take place in the same memory cycle. Therefore all of the samples corresponding to one period of the pseudonoise waveform can be read in a single memory cycle. In the example of FIG. 9, read controller 716 reads M samples from one addresses, or two address, of buffer 710. Each sample is N bits long.

At 812, integrator 720 integrates the M samples read from buffers 710, and provides a respective integration result. At 814, correlator 722 correlates the integration result with one or more reference waveforms 724. Each reference waveform 724 represents a pseudorandom number. Correlator 722 provides a correlation result for each reference waveform 724. At 816 transmitter identification module 726 determines an identity of a transmitter of GPS signal 704 based on the correlation results. For example, transmitter identification module 726 identifies the pseudorandom number used to modulate GPS signal 704 based on correlation peaks in the correlation result, and identifies the GPS transmitter using the pseudorandom number. The GPS transmitter can be a GPS satellite, a GPS pseudolite, or the like. At 818, location module 728 determines a location of digital signal processing system 700 based on the identity of the GPS transmitter. For example, location module 728 employs a pseudorange and location for the GPS transmitter to determine the location.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:
1. An apparatus comprising:
   a sampler configured to sample a signal, wherein the signal is modulated with a periodic waveform having a plurality of periods, wherein the sampler samples the signal K times during each of the plurality of periods to provide K samples for each of the plurality of periods, wherein each of the K samples of the plurality of periods includes N bits, and where K is an integer greater than 0 and N is an integer greater than 1;
   a first memory bank having M columns and K rows, wherein each of the M columns includes N bits, and where M is an integer greater than 0;

a write controller configured to write the K samples of the plurality of periods to the first memory bank in column order, wherein each of the M columns stores the K samples for a respective one of the plurality of periods;

a read controller configured to read the K samples of the plurality of periods from the first memory bank in row order; and an integrator configured to integrate samples read from each of the K rows on a row-by-row basis to provide an integration result for each of the K rows, wherein each of the integration results is a result of integrating samples read from a corresponding row of the first memory bank.

2. The apparatus of claim 1, further comprising:
a first buffer comprising the first memory bank; and
a second buffer comprising a second memory bank, wherein:
the second memory bank has M columns and K rows, each column of the second memory bank includes N bits;
the write controller is configured to write (i) a first K×M consecutive samples to the first memory bank in column order, and (ii) write a second K×M consecutive samples to the second memory bank in column order; and
wherein the read controller is configured to read, in row order, (i) the first K×M samples from the first memory bank, and (ii) the second K×M samples from the second memory bank.

3. The apparatus of claim 1, further comprising a correlator configured to correlate the integration results for the K rows with a second waveform, wherein the second waveform represents a pseudorandom number.

4. The apparatus of claim 3, further comprising a transmitter identification module configured to determine an identity of a transmitter of the signal based on an output of the correlator.

5. The apparatus of claim 4, further comprising a location module configured to determine a location of the apparatus based on the identity of the transmitter.

6. The apparatus of claim 5, further comprising a receiver configured to receive the signal.

7. A device comprising the apparatus of claim 6.

8. The apparatus of claim 1, wherein the signal is a global positioning system (GPS) signal.

9. The apparatus of claim 1, wherein each of the K rows stores samples of the signal having a same phase.

10. A method comprising:
sampling a signal, wherein the signal is modulated with a periodic waveform having a plurality of periods, wherein the signal is sampled K times during each of the plurality of periods to provide K samples for each of the plurality of periods, wherein each of the K samples of the plurality of periods includes N bits, and where K is an integer greater than 0 and N is an integer greater than 1;
writing the samples to a first memory bank in column order, wherein the first memory bank has M columns and K rows, wherein each of the M columns includes N bits and stores the K samples for a respective one of the plurality of periods, and where M is an integer greater than 0;
reading the K samples of the plurality of periods from the first memory bank in row order; and
integrating the samples of the plurality of periods read from the first memory bank on a row-by-row basis to provide an integration result for each of the K rows, wherein each of the integration results is a result of integrating samples read from a corresponding row of the first memory bank.

11. The method of claim 10, further comprising:
writing a first K×M consecutive samples to the first memory bank in column order, wherein the first memory bank is in a first buffer;
writing a second K×M consecutive samples in column order to a second memory bank in a second buffer, wherein the second memory bank has M columns and K rows, and wherein each of the M columns of the second memory bank includes N bits; and
reading, in row order, the first K×M samples from the first memory bank and the second K×M samples from the second memory bank.

12. The method of claim 10, further comprising correlating the integration results for the K rows with a second waveform, wherein the second waveform represents a pseudorandom number.

13. The method of claim 12, further comprising determining an identity of a transmitter of the signal based on an output of the correlator.

14. The method of claim 13, further comprising determining a location of a device based on the identity of the transmitter.

15. The method of claim 10, wherein the signal is a global positioning system (GPS) signal.

16. Non-transitory computer-readable media storing instructions executable by a computer, the instructions comprising:
writing K samples of a signal to a first memory bank in column order, wherein the signal is modulated with a periodic waveform having a plurality of periods, wherein the signal is sampled K times for each of the plurality of periods to provide K samples for each of the plurality of periods, wherein each of the K samples of the plurality of periods includes N bits, wherein the first memory bank has M columns and K rows, wherein each of the M columns includes N bits, and where K is an integer greater than 0, N is an integer greater than 1, and M is an integer greater than 0;
reading the K samples of the plurality of periods from the first memory bank in row order; and
integrating the samples read from each of the K rows on a row-by-row basis to provide an integration result for each of the K rows, wherein each of the integration results is a result of integrating samples read from a corresponding row of the first memory bank.

17. The non-transitory computer-readable media of claim 16, wherein the instructions further comprise:
writing a first K×M consecutive samples to the first memory bank in column order, wherein the first memory bank is in a first buffer;
writing a second K×M consecutive samples in column order to a second memory bank in a second buffer, wherein the second memory bank has M columns and K rows, and wherein each column of the second memory bank includes N bits; and
reading, in row order, the first K×M samples from the first memory bank and the second memory bank.

18. The non-transitory computer-readable media of claim 16, wherein instructions further comprise correlating the integration results for the K rows with a second waveform, wherein the second waveform represents a pseudorandom number.

19. The non-transitory computer-readable media of claim 18, wherein the instructions further comprise determining an identity of a transmitter of the signal based on an output of the correlator.

20. The non-transitory computer-readable media of claim 19, wherein the instructions further comprise determining a location of a device based on the identity of the transmitter.

21. The non-transitory computer-readable media of claim 17, wherein the signal is a global positioning system (GPS) signal.

* * * * *